(12) United States Patent
Pinkham

(10) Patent No.: US 8,446,256 B2
(45) Date of Patent: May 21, 2013

(54) MULTIPLEXING RADIO FREQUENCY SIGNALS

(75) Inventor: Jason Pinkham, McKinney, TX (US)

(73) Assignee: Sirit Technologies Inc., Irvine, CA (US)

( * ) Notice: Subject to any disclaimer, the term of this patent is extended or adjusted under 35 U.S.C. 154(b) by 938 days.

(21) Appl. No.: 12/123,237

(22) Filed: May 19, 2008

(65) Prior Publication Data

US 2009/0284354 A1   Nov. 19, 2009

(51) Int. Cl.
*H04Q 5/22* (2006.01)

(52) U.S. Cl.
USPC ........ 340/10.3; 340/10.1; 340/10.34; 340/2.1

(58) Field of Classification Search .................. 340/10.3, 340/10.31, 10.32
See application file for complete search history.

(56) References Cited

U.S. PATENT DOCUMENTS

| | | |
|---|---|---|
| 3,568,197 A | 3/1971 | Cubley |
| 3,663,932 A | 5/1972 | Mount et al. |
| 3,688,250 A | 8/1972 | Howlett |
| 3,696,429 A | 10/1972 | Tressa |
| 3,876,946 A | 4/1975 | La Clair et al. |
| 3,984,835 A | 10/1976 | Kaplan et al. |
| 4,243,955 A | 1/1981 | Daniel et al. |
| 4,297,672 A | 10/1981 | Furchey et al. |
| 4,325,057 A | 4/1982 | Bishop |
| 4,509,123 A | 4/1985 | Vereen |
| 4,595,915 A | 6/1986 | Close |
| 4,849,706 A | 7/1989 | Davis et al. |
| 4,857,925 A | 8/1989 | Brubaker |
| 4,870,391 A | 9/1989 | Cooper |
| 4,873,529 A | 10/1989 | Gibson |
| 4,903,033 A | 2/1990 | Tsao et al. |
| 4,968,967 A | 11/1990 | Stove |
| 5,012,225 A | 4/1991 | Gill |
| 5,021,780 A | 6/1991 | Fabiano et al. |
| 5,038,283 A | 8/1991 | Caveney |

(Continued)

FOREIGN PATENT DOCUMENTS

| | | |
|---|---|---|
| CA | 2218269 | 4/1999 |
| EP | 0133317 | 2/1985 |

(Continued)

OTHER PUBLICATIONS

Burgener, E.C.; "A Personal Transit Arrival Time Receiver;" IEEE—IEE Vehicle Navigation & Information Systems Conference; Ottawa, Ontario, Canada; 1993; pp. 54-55. Retrieved from <http://ieeexplore.ieee.org/xpl/freeabs_all.jsp?arnumber=585583>.

(Continued)

*Primary Examiner* — Daniel Wu
*Assistant Examiner* — Frederick Ott
(74) *Attorney, Agent, or Firm* — Fish & Richardson P.C.

(57) ABSTRACT

The present disclosure is directed to a system and method for multiplexing radio frequency signals. In some implementations, a system includes a host coupling module, a plurality of antennas, and a processing module. The host coupling module is configured to receive and transmit RF signals through a wired connection. The plurality of antennas are configured to wirelessly transmit RF signals and receive RF signals from RFID tags. The processing module is configured to selectively switch between the plurality of antennas for communication with the RFID tags using the host coupling module and backscatter at least a portion of the received RF signals through the wired connection to communicate information independent of an internal power supply.

14 Claims, 4 Drawing Sheets

U.S. PATENT DOCUMENTS

| | | |
|---|---|---|
| 5,095,536 A | 3/1992 | Loper |
| 5,165,109 A | 11/1992 | Han et al. |
| 5,278,563 A | 1/1994 | Spiess |
| 5,278,569 A | 1/1994 | Ohta et al. |
| 5,293,408 A | 3/1994 | Takahashi et al. |
| 5,334,822 A | 8/1994 | Sanford |
| 5,381,157 A | 1/1995 | Shiga |
| 5,396,489 A | 3/1995 | Harrison |
| 5,430,441 A | 7/1995 | Bickley et al. |
| 5,444,864 A | 8/1995 | Smith |
| 5,461,374 A | 10/1995 | Lewiner et al. |
| 5,477,215 A | 12/1995 | Mandelbaum |
| 5,495,500 A | 2/1996 | Jovanovich et al. |
| 5,506,584 A | 4/1996 | Boles |
| 5,519,729 A | 5/1996 | Jurisch et al. |
| 5,539,394 A | 7/1996 | Cato et al. |
| 5,608,379 A | 3/1997 | Narlow et al. |
| 5,613,216 A | 3/1997 | Galler |
| 5,630,072 A | 5/1997 | Dobbins |
| 5,648,767 A | 7/1997 | O'Connor et al. |
| 5,649,295 A | 7/1997 | Shober et al. |
| 5,661,485 A | 8/1997 | Manuel |
| 5,661,494 A | 8/1997 | Bondyopadhyay |
| 5,668,558 A | 9/1997 | Hong |
| 5,708,423 A | 1/1998 | Ghaffari et al. |
| 5,729,576 A | 3/1998 | Stone et al. |
| 5,745,037 A | 4/1998 | Guthrie et al. |
| 5,777,561 A | 7/1998 | Chieu et al. |
| 5,784,414 A | 7/1998 | Bruekers et al. |
| 5,798,693 A * | 8/1998 | Engellenner ............... 340/10.33 |
| 5,825,753 A | 10/1998 | Betts et al. |
| 5,831,578 A | 11/1998 | Lefevre |
| 5,841,814 A | 11/1998 | Cupo |
| 5,850,187 A | 12/1998 | Carrender et al. |
| 5,861,848 A | 1/1999 | Iwasaki |
| 5,892,396 A | 4/1999 | Anderson et al. |
| 5,898,405 A | 4/1999 | Iwasaki |
| 5,905,405 A | 5/1999 | Ishizawa |
| 5,940,006 A | 8/1999 | MacLellan et al. |
| 5,974,301 A | 10/1999 | Palmer et al. |
| 6,025,780 A | 2/2000 | Bowers et al. |
| 6,026,378 A | 2/2000 | Onozaki |
| 6,084,530 A | 7/2000 | Pidwerbetsky et al. |
| 6,094,149 A | 7/2000 | Wilson |
| 6,107,910 A | 8/2000 | Nysen |
| 6,121,929 A | 9/2000 | Olson et al. |
| 6,137,447 A | 10/2000 | Saitoh et al. |
| 6,177,861 B1 | 1/2001 | MacLellan et al. |
| 6,192,225 B1 | 2/2001 | Arpaia et al. |
| 6,219,534 B1 | 4/2001 | Torii |
| 6,229,817 B1 | 5/2001 | Fischer et al. |
| 6,229,987 B1 | 5/2001 | Greeff et al. |
| 6,232,837 B1 | 5/2001 | Yoo et al. |
| 6,275,192 B1 | 8/2001 | Kim |
| 6,317,027 B1 | 11/2001 | Watkins |
| 6,320,542 B1 | 11/2001 | Yamamoto et al. |
| 6,366,216 B1 | 4/2002 | Olesen |
| 6,412,086 B1 | 6/2002 | Friedman et al. |
| 6,414,626 B1 | 7/2002 | Greef et al. |
| 6,442,276 B1 | 8/2002 | Doljack |
| 6,456,668 B1 | 9/2002 | MacLellan et al. |
| 6,459,687 B1 | 10/2002 | Bourlas et al. |
| 6,466,130 B2 | 10/2002 | Van Horn et al. |
| 6,492,933 B1 | 12/2002 | McEwan |
| 6,501,807 B1 | 12/2002 | Chieu et al. |
| 6,531,957 B1 | 3/2003 | Nysen |
| 6,538,564 B1 | 3/2003 | Cole |
| 6,566,997 B1 | 5/2003 | Bradin |
| 6,567,648 B1 | 5/2003 | Ahn et al. |
| 6,603,391 B1 | 8/2003 | Greeff et al. |
| 6,639,509 B1 | 10/2003 | Martinez |
| 6,700,547 B2 | 3/2004 | Mejia et al. |
| 6,714,121 B1 | 3/2004 | Moore |
| 6,714,133 B2 | 3/2004 | Hum et al. |
| 6,768,441 B2 | 7/2004 | Singvall et al. |
| 6,774,685 B2 | 8/2004 | O'Toole et al. |
| 6,784,789 B2 | 8/2004 | Eroglu et al. |
| 6,794,000 B2 | 9/2004 | Adams et al. |
| 6,798,384 B2 | 9/2004 | Aikawa et al. |
| 6,816,125 B2 | 11/2004 | Kuhns et al. |
| 6,819,938 B2 | 11/2004 | Sahota |
| 6,831,603 B2 | 12/2004 | Menache |
| 6,838,989 B1 | 1/2005 | Mays et al. |
| 6,888,509 B2 | 5/2005 | Atherton |
| 6,974,928 B2 | 12/2005 | Boom |
| 7,009,496 B2 | 3/2006 | Arneson et al. |
| 7,034,689 B2 | 4/2006 | Teplitxky et al. |
| 7,039,359 B2 | 5/2006 | Martinez |
| 7,043,269 B2 | 5/2006 | Ono et al. |
| 7,053,755 B2 | 5/2006 | Atkins et al. |
| 7,058,368 B2 | 6/2006 | Nicholls et al. |
| 7,084,769 B2 | 8/2006 | Bauer et al. |
| 7,088,248 B2 | 8/2006 | Forster |
| 7,091,828 B2 | 8/2006 | Greeff et al. |
| 7,095,324 B2 | 8/2006 | Conwell et al. |
| 7,095,985 B1 | 8/2006 | Hofmann |
| 7,099,406 B2 | 8/2006 | Najarian et al. |
| 7,099,671 B2 | 8/2006 | Liang |
| 7,100,835 B2 | 9/2006 | Selker |
| 7,109,867 B2 | 9/2006 | Forster |
| 7,155,172 B2 | 12/2006 | Scott |
| 7,180,402 B2 | 2/2007 | Carrender et al. |
| 7,197,279 B2 | 3/2007 | Bellantoni |
| 7,199,713 B2 | 4/2007 | Barink et al. |
| 7,215,976 B2 | 5/2007 | Brideglall |
| 7,221,900 B2 | 5/2007 | Reade et al. |
| 7,256,682 B2 | 8/2007 | Sweeney, II |
| 7,257,079 B1 | 8/2007 | Bachrach |
| 7,284,703 B2 | 10/2007 | Powell et al. |
| 7,357,299 B2 | 4/2008 | Frerking |
| 7,375,634 B2 | 5/2008 | Sprague |
| 7,385,511 B2 | 6/2008 | Muchkaev |
| 7,388,468 B2 | 6/2008 | Diorio et al. |
| 7,388,501 B2 | 6/2008 | Tang et al. |
| 7,409,194 B2 | 8/2008 | Shi et al. |
| 7,411,505 B2 | 8/2008 | Smith et al. |
| 7,413,124 B2 | 8/2008 | Frank et al. |
| 7,429,953 B2 | 9/2008 | Buris et al. |
| 7,432,817 B2 | 10/2008 | Phipps et al. |
| 7,432,874 B2 | 10/2008 | Meissner |
| 7,440,743 B2 | 10/2008 | Hara et al. |
| 7,450,919 B1 | 11/2008 | Chen et al. |
| 7,460,014 B2 | 12/2008 | Pettus |
| 7,477,887 B2 | 1/2009 | Youn |
| 7,479,874 B2 | 1/2009 | Kim et al. |
| 7,492,812 B2 | 2/2009 | Ninomiya et al. |
| 7,526,266 B2 | 4/2009 | Al-Mahdawi |
| 7,548,153 B2 | 6/2009 | Gravelle et al. |
| 7,551,085 B2 | 6/2009 | Pempsell et al. |
| 7,557,762 B2 | 7/2009 | Shimasaki et al. |
| 7,561,866 B2 | 7/2009 | Oliver et al. |
| 7,562,083 B2 | 7/2009 | Smith et al. |
| 7,570,164 B2 | 8/2009 | Chakraborty et al. |
| 7,576,657 B2 | 8/2009 | Duron et al. |
| 7,580,378 B2 | 8/2009 | Carrender et al. |
| 7,583,179 B2 | 9/2009 | Wu et al. |
| 7,586,416 B2 | 9/2009 | Ariyoshi et al. |
| 7,592,898 B1 | 9/2009 | Ovard et al. |
| 7,592,915 B2 | 9/2009 | Liu |
| 7,594,153 B2 | 9/2009 | Kim et al. |
| 7,595,729 B2 | 9/2009 | Ku et al. |
| 7,596,189 B2 | 9/2009 | Yu et al. |
| 7,606,532 B2 | 10/2009 | Wuidart |
| 7,609,163 B2 | 10/2009 | Shafer |
| 7,612,675 B2 | 11/2009 | Miller et al. |
| 2001/0048715 A1 | 12/2001 | Lee et al. |
| 2002/0021208 A1 | 2/2002 | Nicholson et al. |
| 2002/0067264 A1 | 6/2002 | Soehnlen |
| 2002/0072344 A1 | 6/2002 | Souissi |
| 2002/0119748 A1 | 8/2002 | Prax et al. |
| 2002/0141347 A1 | 10/2002 | Harp et al. |
| 2003/0021367 A1 | 1/2003 | Smith |
| 2003/0052161 A1 | 3/2003 | Rakers et al. |
| 2003/0228860 A1 | 12/2003 | Jou |
| 2005/0084003 A1 | 4/2005 | Duron et al. |
| 2005/0099270 A1 | 5/2005 | Diorio et al. |
| 2005/0099340 A1 | 5/2005 | Suzuki |

| | | | |
|---|---|---|---|
| 2005/0107051 A1 | 5/2005 | Aparin et al. | |
| 2005/0114326 A1 | 5/2005 | Smith et al. | |
| 2005/0116867 A1 | 6/2005 | Park et al. | |
| 2005/0154572 A1* | 7/2005 | Sweeney, II | 703/13 |
| 2005/0156031 A1 | 7/2005 | Goel et al. | |
| 2005/0179520 A1 | 8/2005 | Ziebertz | |
| 2005/0237843 A1 | 10/2005 | Hyde | |
| 2005/0259768 A1 | 11/2005 | Yang et al. | |
| 2006/0022800 A1 | 2/2006 | Krishna et al. | |
| 2006/0086809 A1 | 4/2006 | Shanks et al. | |
| 2006/0098765 A1 | 5/2006 | Thomas et al. | |
| 2006/0103533 A1 | 5/2006 | Pahlavan et al. | |
| 2006/0125603 A1 | 6/2006 | Nahear | |
| 2006/0132313 A1 | 6/2006 | Moskowitz | |
| 2006/0183454 A1 | 8/2006 | Al-Mahdawi | |
| 2006/0214773 A1 | 9/2006 | Wagner et al. | |
| 2006/0238302 A1 | 10/2006 | Loving et al. | |
| 2006/0238305 A1* | 10/2006 | Loving et al. | 340/10.1 |
| 2006/0252398 A1 | 11/2006 | Park et al. | |
| 2006/0267734 A1 | 11/2006 | Taki et al. | |
| 2006/0290502 A1 | 12/2006 | Rawlings | |
| 2007/0001809 A1 | 1/2007 | Kodukula et al. | |
| 2007/0001813 A1 | 1/2007 | Maguire et al. | |
| 2007/0018792 A1 | 1/2007 | Take et al. | |
| 2007/0046432 A1 | 3/2007 | Aiouaz et al. | |
| 2007/0060075 A1 | 3/2007 | Mikuteit | |
| 2007/0082617 A1 | 4/2007 | McCallister | |
| 2007/0133392 A1 | 6/2007 | Shin et al. | |
| 2007/0139200 A1 | 6/2007 | Yushkov et al. | |
| 2007/0164868 A1 | 7/2007 | Deavours et al. | |
| 2007/0188305 A1 | 8/2007 | Drucker | |
| 2007/0206704 A1 | 9/2007 | Zhou et al. | |
| 2007/0206705 A1 | 9/2007 | Stewart | |
| 2007/0222604 A1 | 9/2007 | Phipps et al. | |
| 2007/0222606 A1 | 9/2007 | Phipps et al. | |
| 2007/0236335 A1 | 10/2007 | Aiouaz et al. | |
| 2007/0285238 A1 | 12/2007 | Batra | |
| 2007/0290846 A1 | 12/2007 | Schilling et al. | |
| 2008/0012688 A1 | 1/2008 | Ha et al. | |
| 2008/0018431 A1 | 1/2008 | Turner et al. | |
| 2008/0048867 A1 | 2/2008 | Oliver et al. | |
| 2008/0049870 A1 | 2/2008 | Shoarinejad et al. | |
| 2008/0065957 A1 | 3/2008 | Shoarinejad et al. | |
| 2008/0068173 A1 | 3/2008 | Alexis et al. | |
| 2008/0084310 A1 | 4/2008 | Nikitin et al. | |
| 2008/0136595 A1 | 6/2008 | Finkenzeller | |
| 2008/0143486 A1 | 6/2008 | Downie et al. | |
| 2008/0191961 A1 | 8/2008 | Tuttle | |
| 2008/0258916 A1 | 10/2008 | Diorio et al. | |
| 2008/0278286 A1 | 11/2008 | Takaluoma et al. | |
| 2009/0009296 A1* | 1/2009 | Shafer | 340/10.1 |
| 2009/0022067 A1 | 1/2009 | Gotwals | |
| 2009/0053996 A1 | 2/2009 | Enguent et al. | |
| 2009/0091454 A1 | 4/2009 | Tuttle | |
| 2009/0096612 A1 | 4/2009 | Seppa et al. | |
| 2009/0101720 A1 | 4/2009 | Dewan et al. | |

FOREIGN PATENT DOCUMENTS

| | | |
|---|---|---|
| EP | 0498369 | 8/1992 |
| EP | 0156440 | 12/1992 |
| EP | 0915573 | 5/1999 |
| EP | 0923061 | 6/1999 |
| EP | 1095427 | 5/2001 |
| EP | 1436857 | 7/2004 |
| FR | 2648602 | 12/1990 |
| GB | 1270456 | 4/1972 |
| JP | 1158836 | 6/1989 |
| JP | 2002-185381 | 6/2002 |
| JP | 2005-227818 | 8/2005 |
| JP | 2005-253058 | 9/2005 |
| JP | 2006-252367 | 9/2006 |
| KR | 2002-0091572 | 12/2002 |
| WO | WO 90/16119 | 12/1990 |
| WO | WO 99/05659 | 2/1999 |
| WO | WO 01/24407 | 4/2001 |
| WO | WO 03/044892 | 5/2003 |
| WO | WO 2004/001445 | 12/2003 |
| WO | WO 2005/072137 | 8/2005 |
| WO | WO 2006/037241 | 4/2006 |
| WO | WO 2006/068635 | 6/2006 |
| WO | WO 2007/003300 | 1/2007 |
| WO | WO 2007/094787 | 8/2007 |
| WO | WO 2007/126240 | 11/2007 |
| WO | WO 2009/058809 | 5/2009 |

OTHER PUBLICATIONS

Cavoukian, Ann; "Adding an On/Off Device to Activate the RFID in Enhanced Driver's Licenses: Pioneering a Made-in-Ontario Transformative Technology that Delivers Both Privacy and Security"; Information and Privacy Commissioner of Ontario; Ontario, Canada; Mar. 2009; 3 pages. Retrieved from <http://www.ipc.on.ca/images/Resources/edl.pdf>.

Desmons, Dimitri; "UHF Gen 2 for Item-Level Tagging"; Impinji, Inc.; 24 pages. Retrieved from <http://www.impinj.com/files/Impinj_ILT_RFID_World.pdf>, Mar. 6, 2006.

Donovan, John; "Software-Defined Radio Tackles Wireless Compatibility Issues"; Portable Design; Apr. 2006; pp. 8-12, Retrieved from <http://www.qmags.com/download/default.aspx?pub=PD&upid=11675&fl=others/PD/PD_20060401_Apr_2006.pdf>.

Hiltunen, Kimmo; "Using RF Repeaters to Improve WCDMA HSPDA Coverage and Capacity inside Buildings"; The 17th Annual IEEE International Symposium on Personal, Indoor, and Mobile Radio Communications (PIMRC-06); 2006; 5 pages. Retrieved from <http://www.ericsson.com/technology/research_papers/wireless_access/doc/PIMRC06_hiltunen.pdf>.

Khandelwal, G. et al.; "OPT: Optimal Protocol Tree for Efficient Tag Identification in Dense RFID Systems"; IEEE International Conference on Communications; Jun. 11-15, 2006; pp. 128-133.

Kusy et al.; "Tracking Mobile Nodes Using RF Doppler Shifts"; Vanderbilt University, Nashville, Tennessee; 14 pages. Retrieved from <http://www.isis.vanderbilt.edu/sites/default/files/Kusy_B_11_7_2007_Tracking_M.pdf>, Nov. 9, 2007.

"New Alien Software Can Identify Velocity, Position of Tags"; RFID News; Apr. 14, 2008; 2 pages. Retrieved from <http://www.rfidnews.org/2008/04/14/new-alien-software-can-identify-velocity-position-of-tags>.

O'Connor, Mary Catherine; "Wal-Mart Seeks UHF for Item-Level"; RFID Journal, Inc.; 2005; 2 pages. Retrieved from <http://www.rfidjournal.com/article/articleview/2228/1/1>.

Rohatgi, A. et al.; "Implementation of an Anti-Collision Differential-Offset Spread Spectrum FRID System"; Georgia Institute of Technology, School of Electrical and Computer Engineering; IEEE Antennas Propagation Society International Symposium 2006; 4 pages. Retrieved from <http://www.propagation.gatech.edu/Archive/PG_CP_060710_AR/PG_CP_060710_AR.PDF>.

Yu, P. et al.; "Securing RFID with Ultra-Wideband Modulation"; Virginia Tech Electrical and Computer Engineering Department; Blacksburg, VA; Workshop on RFID Security; Jul. 2006; 12 pages. Retrieved from <http://events.iaik.tugraz.at/RFIDSec06/Program/papers/004%20-%20Ultra%20Wideband%20Modulation.pdf>.

"Near Field UHF Versus HF"; IDTechEx; May 16, 2006; 1 page. Retrieved from <http://www.idtechex.com/research/articles/near_field_uhf_versus_hf_00000474.asp>.

Kiming, Q. et al.; "Development of a 3cm Band Reflected Power Canceller"; Research Institute of Navigation Technology; 2001 CIE International Conference on, Proceedings; 2001; pp. 1098-1102.

"Developments in Printed Conductors and Tags"; IDTechEx; Jun. 6, 2005; 1 page. Retrieved from <http://www.idtechex.com/research/articles/developments_in_printed_conductors_and_tags_00000188.asp>.

Ryu, H-K. et al.; "Size Reduction in UHF Band RFID Tag Antenna Based on Circular Loop Antenna"; 18th International Conference on Applied Electromagnetics and Communications, ICECom; Oct. 12-14, 2005; pp. 1-4.

Binu P, et al.; "A New Microstrip Patch Antenna for Mobile Communications and Bluetooth Applications"; Microwave and Optical Technology Letters; vol. 33, No. 4, May 20, 2002; pp. 285-286.

Garg et al.; "Microstrip Radiators"; Microstrip Antenna Design Handbook; Artech House, Inc. Norwood, MA; 2001; pp. 1-72.

Bridgelall, Raj; "Bluetooth/802.11 Protocol Adaptation for RFID Tags"; Symbol Technologies, Research & Development, One Symbol Plaza, Holtsville, New York 11742; 4 pages. Retrieved from http://www2.ing.unipi.it/ew2002/proceedings/001.pdf; Apr. 17, 2002.

Han Y. et al.; "System Modeling and Simulation of RFID"; Auto-ID Labs at Fudan University, Shanghai, P.R. China; 12 pages. Retrieved from http://citeseerx.ist.psu.edu/viewdoc/download?doi=10.1.1.116.7275&rep=rep1&type=pdf; Sep. 2005.

Hansen, T. et al.; "Method for Controlling the Angular Extent of Interrogation Zones in RFID"; Seknion, Inc., 2000 Commonwealth Avenue, Suite 1008, Boston, MA 02135; 12 pages. Retrieved from <http://seknion.com/information/Seknion_Paper_RFID.pdf>; Dec. 2006.

Khandelwal, G. et al. "Intelligent MAC Design for RFID Networks"; The Pennsylvania State University; 1 page; Feb. 4, 2011.

Waldrop et al.; "Colorwave: A MAC for RFID Reader Networks"; Auto-ID Center, Massachusetts Institute of Technology, Cambridge, MA; 4 pages; Aug. 29, 2002.

"Radio Frequency Identification (RFID) Primer" 23 pages. Retrieved from <http://ocw.mit.edu/NR/rdonlyres/Sloan-School-of-Management/15-762JSpring-2005/23F46055-7F21-4046-B2C3-7E96680790DD/0/rfid_primer.pdf>; Spring 2005.

* cited by examiner

MULTIPLEXING RADIO FREQUENCY SIGNALS

TECHNICAL FIELD

This invention relates to multiplexing radio frequency signals and, more particularly, to multiplexing radio frequency signals for radio frequency identification (RFID).

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. At the same time other nearby readers also transmit 1 watt, sometimes on the same channel or nearby channels. Although the transponder backscatter signal is, in some cases, separated from the readers' transmission on a sub-carrier, the problem of filtering out unwanted adjacent reader transmissions is very difficult.

SUMMARY

The present disclosure is directed to a system and method for multiplexing radio frequency signals. In some implementations, a system includes a host coupling module, a plurality of antennas, and a processing module. The host coupling module is configured to receive and transmit RF signals through a wired connection. The plurality of antennas are configured to wirelessly transmit RF signals and receive RF signals from RFID tags. The processing module is configured to selectively switch between the plurality of antennas for communication with the RFID tags using the host coupling module and backscatter at least a portion of the received RF signals through the wired connection to communicate information independent of an internal power supply.

DESCRIPTION OF DRAWINGS

Like reference symbols in the various drawings indicate like elements.

DETAILED DESCRIPTION

Figure 1A:
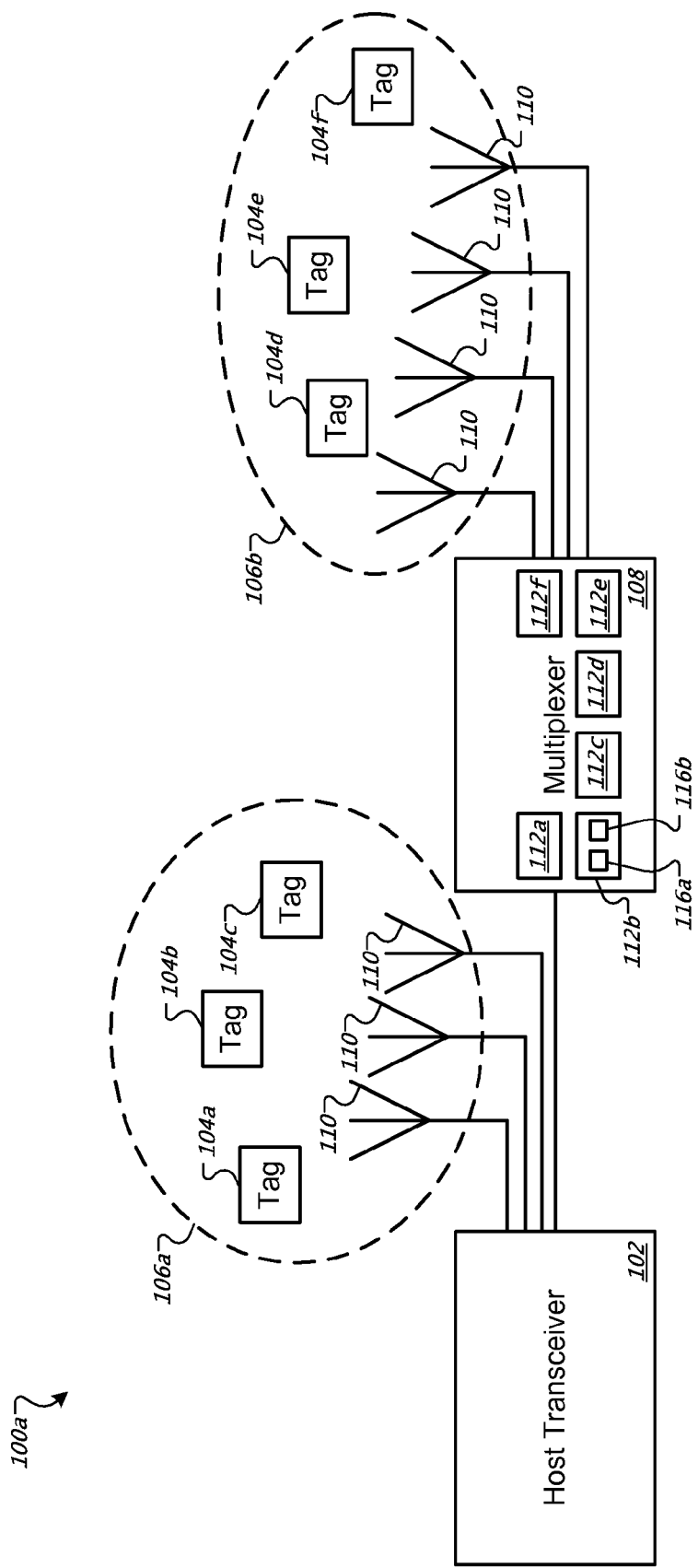
FIGS. 1A and 1B are block diagrams illustrating example interrogation systems in accordance with some implementations of the present disclosure.
Figure 1B:
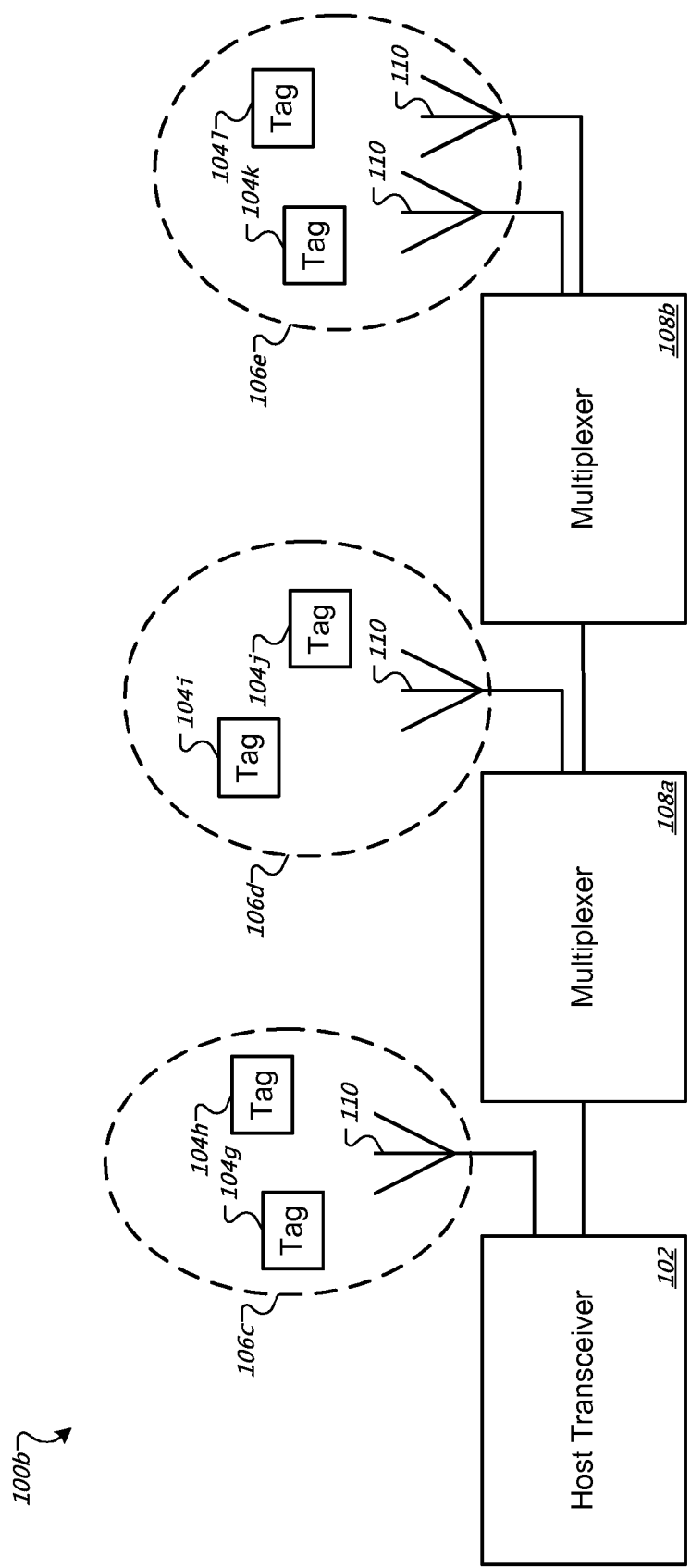

FIGS. 1A and 1B are block diagrams illustrating an example system 100*a* and 100*b*, respectively, for multiplexing Radio Frequency (RF) signals in accordance with some implementations to the present disclosure. For example, the system 100 may selectively switch communications between a plurality of antennas based, at least in part, on communications received through a wired connection. In some implementations, the system 100 may multiplex RF signals based, at least in part, on signals received through a single wired connection. In some implementations, the system 100 may operate using power based on RF signals received through a single wired connection. In general, the system 100 may perform one or more of the following: receive RF signals through a single wired connection (e.g., commands, signals for RFID tags); selectively switch between antennas for communicating with RFID tags; backscatter RF signals received through a wired connection to transmit information (e.g., response, status information) to a host RF transceiver; operate elements based on power from RF signals received through a single wired connection to a host RF transceiver; forward received RF signals to a second multiplexing device through a wired connection; and/or others. In operating the system 100 in accordance with some of these implementations, the system 100 may provide one or more of the following advantages: a single control line (e.g., a coaxial cable or another type of transmission line) that to multiplex RF signals and/or power at least a portion of a multiplexer; an RFID multiplexer may be located at any point between an RFID host and antennas, minimizing or otherwise reducing installation and/or infrastructure costs; transmitting wired communications to a host RF transceiver using power from RF signals received through the same wired connection; and/or other advantages.

Referring to FIG. 1A, the RFID system 100*a* includes, at a high level, RFID tags 104*a-f* communicably coupled to a host RF transceiver 102. The tags 104*d-f* are communicably coupled to the host transceiver 102 through an RFID multiplexer 108. For example, the host transceiver 102 may wirelessly communicate with the RFID tags 104*d-f* using the RFID multiplexer 108. In some implementations, the RFID multiplexer 108 can receive RF signals from the host transceiver 102 and transmit at least a portion of the received RF signals to the tags 104*d-f* using one or more antennas 110. The RFID multiplexer 108 may demodulate at least a portion of the received RF signals to baseband frequency signals that control one or more aspects of operation of the RFID multiplexer 108. For example, the RFID multiplexer 108 may selectively switch between the antennas 110 to transmit signals to the tags 104*d-f* based, at least in part, on the baseband frequency signals. In some implementations, the RF multiplexer 108 can backscatter at least a portion of the received RF signals to the RFID host 102. In this case, the RF multiplexer 108 may communication information to the RFID host 102 such as status information (e.g., power level) as well as other information. Other information may include identification of a current antenna selection, firmware configuration values, locally stored data, an address and/or identification of the specific RF multiplexer 108, version information for the RF multiplexer 108, version information for a component of the RF multiplexer 108, temperature information, measured incident RF power seen from the host (which may be used, for example, to account for cable losses), and/or other information. In communicating with the host transceiver 102, the RFID multiplexer 108 may emulate an RFID tag such that at least some information is transmitted to the host 102 in accordance with an RFID protocol. In some implementations, the RFID multiplexer 108 can use at least a portion of the received RF signals to power one or more components of the RFID multiplexer 108. For example, the RFID multiplexer 108 may rectify a portion of the received RF signals to DC signals and use the DC signals to power an internal components (e.g., logic). Such elements may include a DC power tap module, a controller module, a DC power jack, transmission modules, a communication module and/or others.

Turning to a more detailed description of the system 100a, the RFID multiplexer 108 can include any software, hardware, and/or firmware configured to multiplex RF signals. For example, the multiplexer 108 may selectively switch between the antennas 110 to communicate with the tags 104d-f independent of an internal power supply such as a battery. In some implementations, the RFID multiplexer 108 include a plurality of modules 112a-#. For example, the RFID multiplexer 108 may include a host coupling module 112a and a communication module 112b, and the communication module 112a may communicates with the RFID host 102 through the host coupling module 112a using a wired connection 114. For example, the host coupling module 112a may be a coaxial cable port such that the RFID host 102 may be directly connected to the RFID multiplexer 108 by a coaxial cable 114. The communication module 112b may receive RF signals from the RFID host 102 and downconvert the RF signals to baseband frequency signals. Baseband frequency signals may include low frequency signals, e.g., near zero frequency. The baseband frequency signals may include information for controlling one or more aspects of multiplexer operation. For example, the baseband frequency signals may identify one or more of the antennas 110 connected to the RFID multiplexer 108. In this case, the multiplexer 108 may selectively switch between the antennas 110 in accordance with the identifying information. In operating at least a portion of the RFID multiplexer 108, the system may provide one or more of the following advantages over alternative systems: a single control line (e.g., a coaxial cable or another type of transmission line) may transfer signals from the RFID host 102 to the RFID multiplexer 108 to operate and power the RFID multiplexer 108 and to communicate with tags 104; the RFID multiplexer 108 may be located at any point between the RFID host 102 and antennas 110, reducing and/or minimizing installation and infrastructure costs; the RFID multiplexer 108 may send reply signals to the RFID host 102 using power received at least in part from the RFID host 102.

In some implementations, the RFID multiplexer 108 includes a switching module 112c and a controller module 112d such that the control modules 112d controls the switching module 112c based, at least in part, on the signals received from the RFID host 102. For example, the switching module 112c may selectively couple one or more antennas 110 to the host coupling module 112a for wireless communication between the host 102 and the tags 104d-f. In some implementations, the RFID multiplexer 108 can act as a port extension for communication between the host 102 and one or more RF tags 104. The communication module 112b may rectify a portion of the RF signals received from the RFID host 102 to DC power signals. The power signals may provide power to one or more components of the RFID multiplexer 108. For example, the communication module 112b may convert 910 MHz signals to low frequency (e.g., 0 Hz) power signals for powering one or more modules or components of the RFID multiplexer 108. The communication module 112b may measure an amount of power received by the RFID multiplexer 108 from the RFID host 102. For example, signal losses along the control line 114 may reduce the amount of power received by the RFID multiplexer 108 from the RFID host 102. The RFID multiplexer 108 may communicate to the RFID host 102 information identifying an amount of measured power received from the RFID host 102, and the RFID host 102 may compensate for power losses by increasing an amount of power transmitted from the RFID host 102 to the RFID multiplexer 108. For example, the RFID multiplexer 108 may serve as a port extension to compensate for line losses and/or deliver an increased amount of RF signal power to one or more of the antennas 110 while remaining within regulatory and/or desired output power criteria.

The communication module 112b may backscatter a portion of the RF signals received from the RFID host 102. For example, the communication module 112b may include one or more tag emulator modules 116 that are analogous to a passive tag operating in the field of the RFID host 102. The tag emulator module 116 may transmit a reply to a received signal from the RFID host 102 using power stored from the previously received RF signals, independent of an internal power source. The communication module 112b may modulate a response signal onto the backscattered RF signal, for example, by modulating the radio cross section of the communication module 112b. The response signal may include information related to the measured amount of power received by the RFID multiplexer 108. The RFID host 102 may receive the backscattered signal. In the previous example, the RFID host 102 may receive the backscattered signal, and based at least in part on the response signal included in the backscattered signal, the RFID host 102 may increase or decrease an amount of power transmitted to the RFID multiplexer 108.

In some implementations where the RFID multiplexer 108 includes a control module 112d, the control module 112d may convert an analog baseband frequency signal to a digital baseband frequency signal. The control module 112d may implement one or more operations based at least in part on the digital baseband frequency signals. For example, the control module 112d may include a processor that controls coupling between the host coupling module 112a and antennas 110. The control module 112d may also convert digital signals to analog signals. For example, the control module 112d may convert a digital baseband frequency digital signal to an analog baseband frequency signal, and the analog baseband frequency signal may include information to be communicated to the RFID host 102. In some cases, the analog baseband frequency signal generated by the control module is modulated and transmitted to the RFID host 102 in a backscattered RF signal.

The RFID multiplexer 108 may include a power tap module 112e to detect a DC signal component of an RF signal received from the RFID host 102. In some implementations, the power tap module 112e can be coupled to the host coupling module 112a of the RFID multiplexer 108. The RFID multiplexer 108 may receive from the RFID host 102 an RF signal that includes a DC power component, and the power tap module 112e may detect the DC power signal component and output the detected DC power signal component to provide power to an internal or external system (e.g., the control module 112d). While the DC component provides power, for example, to the control module 112d, one or more of the antennas 110 may simultaneously transmit a different portion (i.e., a non-DC component) of the received RF signals. For example, the power tap module 112e may pass RF signal components to one or more antennas 110 for transmission to the tags 104d-f.

In some implementations, the RFID multiplexer 108 can include a DC power module 112f to provide power to the RFID multiplexer 108. For example, the DC power module 112f may include a battery or a wall jack with an AC to DC converter. The DC power module may provide power to the controller module 112d and/or or to another components 112 of the RFID multiplexer 108. In some implementations, the DC power module 112f can provide power to the RFID multiplexer 108 to supplement power received by the RFID multiplexer 108 from the RFID host 102.

The RFID host 102 includes any software, hardware, and/or firmware configured to transmit and receive RF signals. In general, the RFID host 102 may transmit requests for information within a certain geographic area associated with RFID host 102. The RFID host 102 may transmit the query in response to a request, automatically, in response to a threshold being satisfied (e.g., expiration of time), as well as others. The interrogation zones 106 may be based on one or more parameters such as transmission power, associated protocol (i.e. set of rules for communication between RFID tags and readers), nearby impediments (e.g. objects, walls, buildings), as well as others. In general, the RFID host 102 may include a controller, a transceiver coupled to the controller, and one or more RF antennas 110 coupled to the transceiver. One or more RF multiplexers 108 may be coupled to the transceiver. For example, the transceiver 102 may be directly connected to the multiplexer 108 through a wired connection 114. In some implementations, the RFID multiplexer 108 can act as a port extension for the RFID host 102. In some examples, the RF antennas 110 connected to the host 102 and the RF antennas 110 connected to the RFID multiplexer 108 may transmit requests and receive responses from RFID tags 104 in the associated interrogation zones 106. In some implementations, the RFID host 102 can determine statistical data based, at least in part, on tag responses. The RFID host 102 often includes a power supply or may obtain power from a coupled source for powering included elements and transmitting signals. In general, the RFID host 102 and the RFID multiplexer 108 operate in one or more specific frequency bands allotted for RF communication. For example, the Federal Communication Commission (FCC) has assigned 902-928 MHz and 2400-2483.5 MHz as frequency bands for certain RFID applications. In some implementations the RFID host 102 and/or the RFID multiplexer 108 can dynamically switch between different frequency bands and/or protocols.

The RFID tags 104 can include any software, hardware, and/or firmware configured to respond to communication from the RFID host 102 and/or from the RFID multiplexer 108. These tags 104 may operate without the use of an internal power supply. Rather, the tags 104 may transmit a reply using power stored from the previously received RF signals, independent of an internal power source. This mode of operation is typically referred to as backscattering. In some implementations, the tags 104 alternate between absorbing power from signals transmitted by the RFID host 102 and transmitting responses to the signals using at least a portion of the absorbed power. In passive tag operation, the tags 104 typically have a maximum allowable time to maintain at least a minimum DC voltage level. In some implementations, this time duration is determined by the amount of power available from an antenna of a tag 104 minus the power consumed by the tag 104 and the size of the on-chip capacitance. The effective capacitance can, in some implementations, be configured to store sufficient power to support the internal DC voltage when there is no received RF power available via the antenna. The tag 104 may consume the stored power when information is either transmitted to the tag 104 or the tag 104 responds to the RFID host 102 (e.g., modulated signal on the antenna input). In transmitting responses back to the RFID host 102, the tags 104 may include one or more of the following: an identification string, locally stored data, tag status, internal temperature, and/or others.

In one aspect of operation, the RFID host 102, using the RFID multiplexer 108, periodically transmit signals to the interrogation zones 106. For example, the RFID host 102 may transmit RF signals to the interrogation zone 106b by transmitting RF signals to the RFID multiplexer 108 using the wired connection 114. The RFID multiplexer 108 may wirelessly transmit at least a portion of the received RF signals received through the wired connection 114 to the interrogation zone 106b. In the event that a tag 104 is within one of the interrogation zones 106, the tag 104 may transmit a response. For example, the tags 104d-f in the interrogation zone 106b may transmit a response to the RFID multiplexer 108, and the RFID multiplexer 108 may then send the received response to the RFID host 102. As another example, the tags 104a-c in the interrogation zone 106a may transmit a response to the RFID host 102.

In another aspect of operation, the RFID host 102 communicates with the RFID multiplexer 108. For example, the RFID host 102 may send to the RFID multiplexer 108 instructions to select one or more of the antennas 110 for wirelessly transmitting signals to the interrogation zone 106b. In this example, the multiplexer 108 may select one of the antennas 110 and pass the identified signal to the antenna 110 for transmission in the interrogation some 106b. In some implementations, the RFID multiplexer 108 may backscatter RF signals to the RFID host 102. For example, the RFID multiplexer 108 may the backscattered RF signal to transmit a response signal indicating an amount of power received from the RFID host 102. The response signal may include other information related to operation of the RFID multiplexer 108. For example, the response signal may include information identifying an amount of power received from an external DC power source, an antenna 110 used to transmit RF signals, an ambient temperature and/or other operating conditions. The RFID host 102 may receive the backscattered RF signal. In response to the backscattered RF signal, the RFID host 102 may, for example, increase or decrease an amount of transmitted RF power. In some cases, the RFID host 102 responds by sending another RF signal to the RFID multiplexer 108 instructing the RFID multiplexer 108 to switch to a different antenna 110.

Referring to FIG. 1B, the system 100b includes a plurality of RF multiplexers 108a and 108b b implemented in a series configuration from a single RFID host 102. The RFID host 102 may communicate with the tags 104g and 104h in the interrogation zone 106c and/or with the RFID multiplexer 108a. The RFID multiplexer 108a may receive RF signals from the RFID host 102. The RFID multiplexer 108a may backscatter at least a portion of the received RF signals to the RFID host 102. The RFID multiplexer 108a may use one or more antennas 110 to wirelessly transmit at least a portion of the received RF signals. For example, the RFID multiplexer 108a may communicate wirelessly with the tags 104i and 104j in the interrogation zone 106d. The RFID multiplexer 108a may receive RF signals from one or more tags 104 and transmit the received RF signals to the RFID host 102. The RFID multiplexer 108a may also communicate with the RFID multiplexer 108b. The RFID multiplexer 108b may receive RF signals from the RFID multiplexer 108a. The RFID multiplexer 108b may backscatter at least a portion of the received RF signals to the RFID multiplexer 108a. The RFID multiplexer 108b may use one or more antennas 110 to wirelessly transmit at least a portion of the received RF signals. For example, the RFID multiplexer 108b may communicate wirelessly with the tags 104k, 104l in the interrogation zone 106e. The RFID multiplexer 108b may receive RF signals from one or more tags 104 and re-transmit the received RF signals to the RFID multiplexer 108a. The RFID multiplexer 108a may, in turn, re-transmit the received RF signals to the RFID host 102. The RFID multiplexer 108b may communicate to the RFID multiplexer 108a an identification of an amount of measured power received from the RFID multiplexer 108a.

Figure 2:
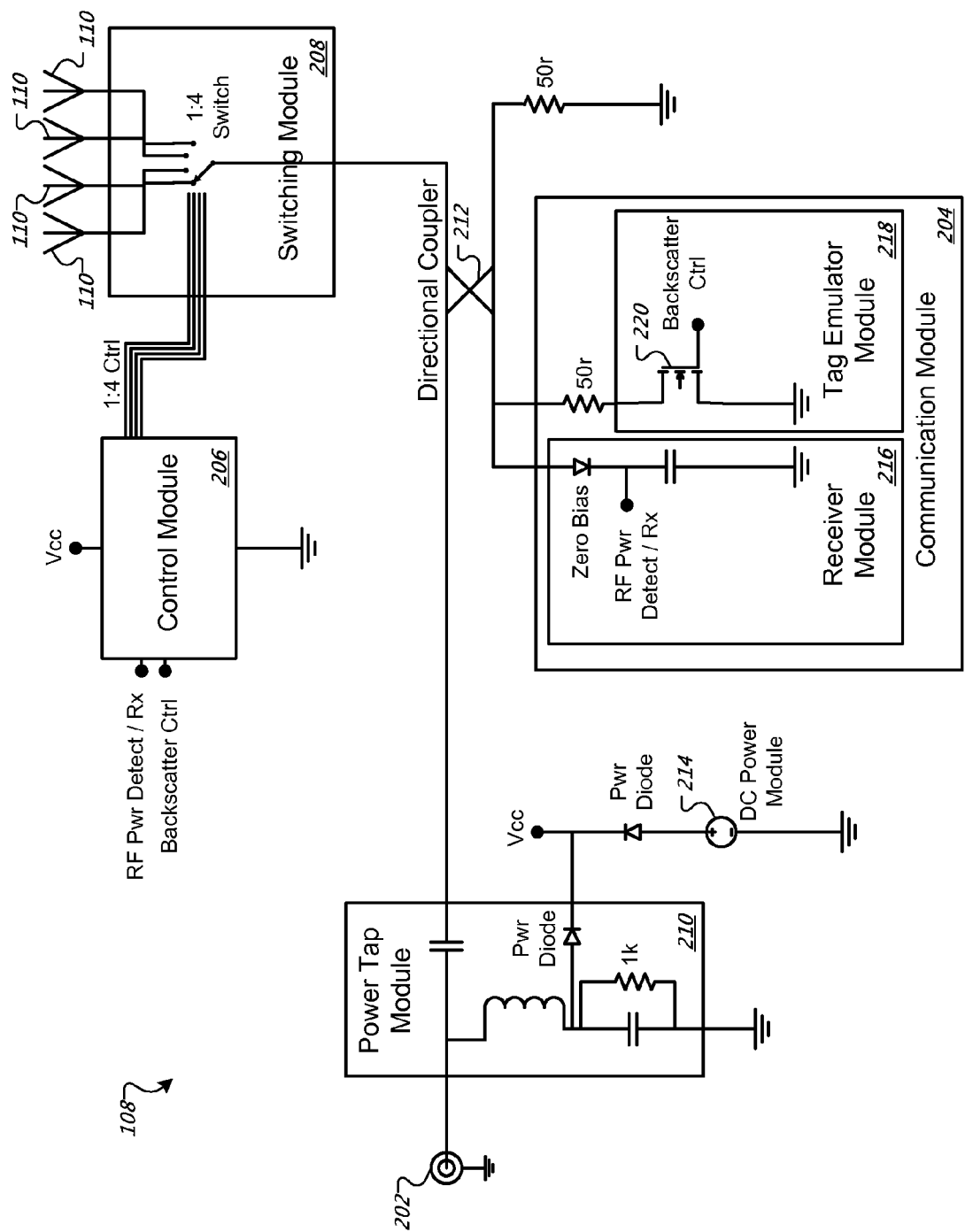
FIG. 2 is a block diagram illustrating an example RFID multiplexer of FIGS. 1A and 1B in accordance with some implementations of the present disclosure.

FIG. 2 illustrates an example RFID multiplexer 108 of FIGS. 1A and 1B in accordance with some implementations of the present disclosure. In particular, the illustrated multiplexer 108 includes a port 202, a communication module 204, a control module 206, and a switching module 208. In some implementations, the RFID multiplexer 108 includes a power tap module 210 and a DC power module 214. The communication module may be coupled to the port 202 through a directional coupler 212. The switching module 208 may selectively connect the port 202 to one or more antennas 110, to another RFID multiplexer 108, and/or to another device. The RF multiplexer 108 may include some, all, additional, or different elements without departing from the scope of this disclosure. For example, the RFID multiplexer 108 may include memory, capacitors, and/or other components. The example RFID multiplexer 108 and its various components are illustrated schematically, and a typical implementation may include components and/or connections not illustrated in the diagram illustrated in FIG. 2.

The port 202 couples the RFID multiplexer 108 to an RFID host 102 (not illustrated), for example, through a single wired connection such as a coaxial cable. The port 202 may receive RF signals from the RFID host 102 and send at least a portion of the received RF signals to the power tap module 210, the communication module 204, and/or the switching module 208. In some implementations, the power tap module 210 is omitted, and at least a portion of the received RF signals are sent directly to the communication module 204 and/or the switching module 208. Signals may also be transmitted back to the RFID host 102 from the RFID multiplexer 108 through the port 202. For example, the communication module 204 may backscatter RF signals to the RFID host 102 through the port 202. As another example, one or more of the antennas 110 may wirelessly receive signals from tags 104, and the received signal may be sent to the RFID host 102 through the port 202.

The communication module 204 can include any software, hardware, and/or firmware configured to communicate with the RFID host 102. As illustrated, the communication module 204 may be implemented with a receiver module 216 and a tag emulator module 218. However, in other implementations, the receiver module 216 and the tag emulator module 218 can be implemented in a different configuration, for example, as a single module. The control module 206 and/or its constituent components may include or have access to one or more amplifiers (e.g., power amplifiers), one or more filtering mechanisms (e.g., low pass filters, high pass filters, band pass filters, band stop filters, and/or others), one or more fixed-frequency oscillators (e.g., a reference or clock signal), and/or other components.

At a high level, the communication module 204 may receive signals from the RFID host 102, and based at least in part on the received RF signals, the communication module 204 may provide baseband frequency signals to the control module 206, backscatter RF signals to the RFID host 102, and/or provide power to one or more components of the RFID multiplexer 108. The baseband signals may include instructions for operating one or more aspects of the RFID multiplexer 108, such as for controlling the switching module 208. In some implementations, the communication module 204 selectively switches between a backscattering mode and a transmission mode. For example, the communication module 204 may receive a backscatter control signal from the control module 206. The backscatter control signal may control a switch in the communication module 204 that activates the backscattering mode of the communication module 204.

In some implementations, the receiver module 216 and the tag emulator module 218 are coupled to the port 202 and/or to each other. The receiver module 216 and the tag emulator module 218 may be connected to the port 202 either directly or indirectly through another component of the RFID multiplexer 108, such as the directional coupler 212 and/or the power tap module 210. In some implementations, the receiver module 216 and the tag emulator module 218 are coupled directly and/or indirectly to the control module 206.

The receiver module 216 may receive an RF signal from the RFID host 102 through the port 202 and/or through a different connection. The receiver module 216 may detect an amount of power received from the RFID host 102. For example, the receiver module 216 may detect 1 milliwatt (mW) of power received from the RFID host 102. The receiver module 216 may communicate to the control module 206, or to a different device, the measured amount of power. In the example, the receiver module 216 communicates to the control module 206 that 1 mW of power is received from the RFID host 102. In some implementations, the RFID multiplexer 108 communicates the measured amount of received power to the RFID host 102. For example, the measured amount of received power may be identified in a signal backscattered from the tag emulator module 218 to the RFID host 102.

The receiver module 216 may convert at least a portion of the received RF signals to power signals. In this manner, the receiver module 216 may provide power to one or more components of the RFID multiplexer 108 based, at least in part, on the received RF signals. In some implementations, the receiver module 216 may includes rectify a portion of the received RF signals to DC power signals, and the DC power signals may provide power to the control module 206 and/or other components of the RFID multiplexer 108.

The receiver module 216 may demodulate at least a portion of the received RF signals to baseband frequency signals. For example, the receiver module 216 may receive a signal having a 910 MHz carrier signal and demodulate the carrier signal out of the received signal to produce a lower frequency baseband signal. The baseband signal may include data or instructions for controlling one or more aspects of operation of the RFID multiplexer 108. For example, the baseband signal may be converted to a digital baseband signal by the control module 206, and based on the digital baseband signal, the control module 206 may send instructions to the switching module 208 to selectively switch one or more of the antennas 110 to the port 202.

The tag emulator module 218 may backscatter RF signals received from the RFID host 102. For example, the tag emulator module 218 may implement one or more RFID communication protocols. In this regard, the tag emulator module 218 may operate similarly to a tag 104. However, the tag emulator module 218, in some implementations, communicates by a wired connection to the RFID host 102, rather than wirelessly, as the tags 104. For example, the tag emulator module 218 may backscatter RF signals through the port 202 and along a coaxial cable connection to the RFID host 102. The tag emulator module 218 may be configured to respond to communication from the RFID host 102. The tag emulator module 218 may operate without the use of an internal power supply. Rather, the tag emulator module 218 may transmit a reply to a received signal from the RFID host 102 using power stored from the previously received RF signals, independent of an internal power source. In transmitting responses back to the RFID host 102, the tags 104 may include one or more of the following: an amount of power received from the RFID host 102, an amount of power received from an external or internal power supply, an identification string, locally stored data, tag status, internal temperature, and/or other information.

The tag emulator module 218 may include any suitable switching mechanism 220 for activating and/or deactivating a backscatter mode. For example, the tag emulator module 218 may receive a signal from the control module 206 that controls the switching mechanism of the tag emulator module 218. The switching mechanism 220 may effectively control an impedance of the tag emulator module 218. For example, when the backscatter mode is activated, the tag emulator module 218 may have a high effective impedance, and when the backscatter mode is deactivated, the tag emulator module 218 may have a low effective impedance (e.g., 50 ohms).

The control module 206 can include any software, hardware, and/or firmware configured to select one or more transmission modules to transmit signals received from an RF host. The control module 206 may include or have access to one or more amplifiers (e.g., power amplifiers), a digital to analog converter (DAC), an analog to digital converter (ADC), one or more filtering mechanisms (e.g., low pass filters, high pass filters, band pass filters, band stop filters, and/or others), one or more fixed-frequency oscillators (e.g., a reference or clock signal), a digital synthesizer, an information processor (e.g., a microprocessor), and/or other components.

The control module 206 may receive analog baseband frequency signals from the receiver module 216. The baseband frequency signals may be based on RF signals received from the RFID host 102. The baseband frequency signals may include instructions to be executed by one or more processors included in the control module 206. For example, one or more processors included in the control module 206 may manipulate the switching module 208 to selectively control connections between the port 202 and one or more of the antennas 110. The control module 206 may control and/or manipulate the switching module 208 using any type of communication interface. In some implementations, the control module 206 communicates with the switching module 208 through a one to four (1:4) control interface. For example, the 1:4 control interface may control a 1:4 switch included in the switching module 208. More generally, a 1:N control interface may be implemented to control a switch, such as a 1:N switch, included in the switching module 208.

The control module 206 may also send signals to the tag emulator module 218. For example, the control module 206 may send a backscatter control signal to activate and/or deactivate a backscatter mode of the tag emulate module 218. In some implementations, the control module 206 sends to the tag emulator module 218 a response signal to include in a backscattered RF signal. For example, the tag emulator module 218 may include the response signal in the backscattered RF signal by modulating the effective radio cross section of the tag emulator module 218.

The control module 206 may receive power from one of or any combination of the communication module 204, the power tap module 210, and/or the DC power module 214. In some implementations, the power tap module 210 and/or the DC power module 214 are not included in the RFID multiplexer 108, and the control module 206 receives power only from the communication module 204. In other implementations, the control module receives power from the communication module 204 in addition to receiving power from at least one of the power tap module 210 or the DC power module 214. In other implementations, the control module 206 only receives power from the power tap module 210 and/or the DC power module 214. In some cases, the amount of power received from the communication module is less than a desired or required power, and the power tap module 210 and/or the DC power module 214 are activated to provide supplemental power. In some cases, the power tap module 210 and/or the DC power module 214 are present but inactive, providing no power to the RFID multiplexer 108.

The switching module 208 selectively switches antennas 110 to the port 202 and/or a different host coupling module. For example, the switching module 208 may include a one to four (1:4) switch that couples the port 202 to one of four antennas 110. In other cases, the switching module may couple the port 202 to more than one antenna 110, another RFID multiplexer 108, and/or another device.

The power tap module 210 provides power to one or more components of the RFID multiplexer 108 based on a DC signal component received through the host coupling module from the RFID host 102. The power tap module 210 may include capacitors, inductors, resistors, diodes, filters, amplifiers, and/or a variety of other electronic components. In some implementations, the RFID multiplexer 108 receives from the RFID host 102 a signal that includes an RF signal superposed on a DC signal. The power tap module 210 may detect the DC signal component and provide power to the RF multiplexer based on the detected DC signal. For example, the power tap module 210 may separate the DC signal component out of the received signal and pass the DC signal component to the control module 206 through the illustrated Vcc connection. In some implementations, the DC power signal is passed to additional and/or different components. The power tap module 210 may be implemented as a Bias-T DC power tap module, or any other suitable configuration.

The directional coupler 212 provides signal direction-selective coupling between the host coupling module 202, the communication module 204, and the switching module 208. For example, signals sent from the port 202 to the switching module 208 may also be received by the communication module 204 through the directional coupler 212, but signals sent from the switching module 208 to the port 202 may bypass the communication module 204. Similarly, signals sent from the communication module 204 to the port 202 may not be received by the switching module 208.

The DC power module 214 provides power to one or more components of the RFID multiplexer 108 from one or more external or internal sources. The DC power module 214 may be implemented as a battery, a wall plug, and/or any other power supply. In some cases, the DC power module 214 may include an AC to DC converter for converting an AC signal (e.g. 60 Hz, 120 Hz, or others) to a DC power signal.

The antennas 110 wirelessly receive and transmit RF signals between the tags 104 and the RFID host 102. For example, the antenna 110 may transmit a query for information associated with the tag 104, and the antenna 110 may receive, in response to at least the inquiry, information including an identifier.

In one aspect of operation, the communication module 204 receives an RF signal from the RFID host 102 through the port 202. The receiver module 216 detects the power of the received RF signal and communicates the measurement to the control module 206. The control module 206 activates a backscatter mode, and the tag emulator module 218 begins modulating impedance of the port 202 to backscattered RF signals. The tag emulator module 218 may amplitude modulate and/or phase modulate the backscattered RF signals in order to modulate data to the RF host 102. The response signal identifies the amount of received power. In some implementations, the DC power module 214 can be activated to operate at least a portion of the RFID multiplexer 108.

In another aspect of operation, the communication module 204 demodulates the received RF signals to baseband frequency signals and passes the baseband frequency signals to the control module 206. The control module 206 converts the baseband frequency signals to digital signals, and based at least in part on the received signals, the control module 206 manipulates the switching module 208 to control coupling between the port 202 and one or more antennas 110.

In another aspect of operation, the power tap module 210 receives an RF signal from the RFID host 102 through the port 202. The power tap module 210 detects a DC component of the received signal and provides power to the control module 206 based on the DC signal component. The power tap module 210 passes the AC components of the received signal to one or more of the antennas 110 for wireless transmission, for example, to tags 104. If a response signal is received from a tag 104, the response signal may be sent to the RFID host 102 through the port 202.

Figure 3:
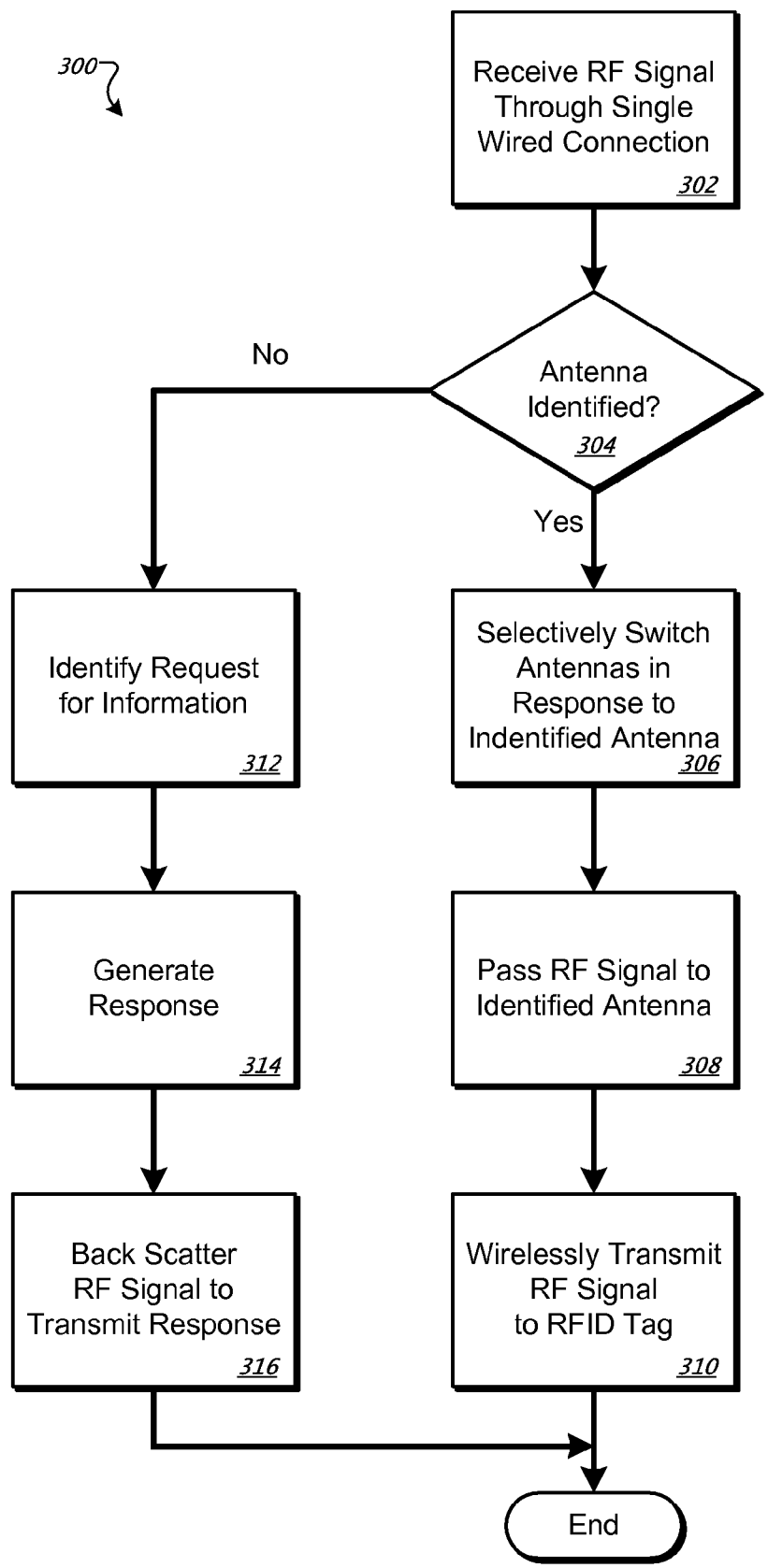
FIG. 3 is a flow chart illustrating an example method for using an RFID multiplexer of FIGS. 1A and 1B.

FIG. 3 is a flow chart illustrating an example method 300 for multiplexing RF signals. In general, the method 300 may be used to operate an RF multiplexer based on power received from an RF host. In some implementations, the method 300 can include the same, additional, fewer, and/or different steps.

The method 300 begins at step 302 where RF signals are received from an RFID host through a single wired connection. For example, the RFID multiplexer 108 may receive RF signals from the RFID host 102 through the wired connection 114. If an antenna is identified based, at least in part, on the received RF signal at decisional step 304, then, at step 306, a plurality of antennas are selectively switched in accordance with the identified antenna. For example, the multiplexer 108 may selectively switch the switching module 208 to connect the identified antenna to the pot 202. At step 308, at least a portion of the received RF signals is passed to the identified antenna and wirelessly transmitted, at step 310, to an RFID tag using the identified antenna. Returning to decisional step 304, if the RF signal does not identify an antenna for transmission, then a request for information is identified at step 312. For example, the multiplexer 108 may identify a request to identify transmitted power of the RF signal. At step 314, a response is generated and transmitted, at step 316, by backscattering RF signals transmitted through the single wired connection. For example, the multiplexer 108 may backscattered RF signals transmitted through the single wired connection 114 to the RF host 120.

A number of embodiments of the invention have been described. Nevertheless, it will be understood that various modifications may be made without departing from the spirit and scope of the invention. Accordingly, other embodiments are within the scope of the following claims.

What is claimed is:

1. A radio frequency identification (RFID) multiplexer system, comprising:
   a plurality of multiplexers connected in series including an initial multiplexer; and
   a control unit connected to the initial multiplexer and comprising:
      a host coupling module configured to receive and transmit RF signals through a wired connection to an RFID reader, wherein the received RF signals include signals for wireless transmission and control signals for antenna switching;
      a power module configured to transmit, to the plurality of multiplexers in series, Direct Current (DC) components combined with RF signals from the RFID reader;
      a processing module configured to detect power levels of RF signals received from the RFID reader, backscatter at least a portion of the received RF signals from the RFID reader through the wired connection to communicate information including the detected power levels of the RF signals received from the RFID reader, and transmit both the RF signals for wireless transmission and the control signals for antenna switching to the plurality of multiplexers connected in series; and
      a tag emulator module configured to emulate an RFID tag such that the backscattered signal is transmitted in accordance with an RFID protocol, wherein the tag emulator module may transmit a reply to a received signal from the RFID reader using power stored from the previously received RF signals, independent of an internal power source.

2. The RFID multiplexer of claim 1, wherein the wired connection comprises a single wired connection to a host RF transceiver.

3. The RFID multiplexer of claim 1, the processing module further configured to demodulate at least a portion of the received RF signals from the RFID reader to produce baseband frequency signals.

4. The RFID multiplexer of claim 1, wherein the backscattered signal at least identifies information associated with one or more operating parameters of the RFID multiplexer.

5. The RFID multiplexer of claim 1, the processing module further configured to generate power for operating the multiplexer based, at least in part, on at least a portion of the received RF signals.

6. The RFID multiplexer of claim 1, the processing module further configured to at least amplitude modulate or phase modulate to backscatter data.

7. The RFID multiplexer of claim 1, further comprising a control module configured to selectively switch between the plurality of antennas based, at least in part, on received RF signals.

8. The RFID multiplexer of claim 1, further comprising a DC power module configured to convert AC power signals from external supply to DC power signals.

9. The RFID multiplexer of claim 1, wherein the wired connection separates the RFID multiplexer from an RFID host transceiver by 5 feet (ft.) or more.

10. The RFID multiplexer of claim 1, wherein the RFID multiplexer is connected to a different RFID multiplexer through a different single wired connection such that RF signals from a RFID host transceiver can be passed to the different RFID multiplexer.

11. The RFID multiplexer of claim 10, wherein the single wired connection and the different single wired connection comprise coaxial cables.

12. A radio frequency identification (RFID) multiplexer system, comprising:
   a plurality of multiplexers connected in series including an initial multiplexer; and
   a control unit connected to the initial multiplexer and comprising:

a port configured to receive RF signals from an RFID host, wherein the received RF signals include signals for wireless transmission and control signals for antenna switching;

a communication module configured to demodulate at least a portion of the received RF signals to baseband frequency signals and to convert at least a portion of the received RF signals to power signals;

a receiver module configured to detect power levels of RF signals received from the RFID host;

a power module configured to transmit, to the plurality of multiplexers in series, Direct Current (DC) components include combined with RF signals from the RFID host;

a tag emulator module configured to backscatter, in accordance with an RFID protocol, at least a portion of the received RF signals through the port to communicate information including the detected power levels of the RF signals received from the RFID host, wherein the tag emulator module may transmit a reply to a received signal from the RFID host using power stored from the previously received RF signals, independent of an internal power source; and a control module configured to receive power based, at least in part, on the DC components and transmit both the RF signals for wireless transmission and the control signals for antenna switching to the plurality of multiplexers connected in series.

13. A method of controlling an RFID multiplexer, comprising:

receiving RF signals through a single wired connection to an RFID reader, wherein the received RF signals include signals for wireless transmission and control signals for antenna switching;

detecting power levels of the received RF signals;

transmit, to a plurality of multiplexers in series, Direct Current (DC) components combined with RF signals from the RFID reader;

generate power for the multiplexer using the DC components;

transmitting, through a wired connection, both the RF signals for wireless transmission and the control signals for antenna switching to the plurality of multiplexers connected in series;

backscattering, in accordance with an RFID protocol, at least a portion of the received RF signals in response to at least identifying requests for information, wherein the backscattered portion identifies the detected power levels of the RF signals received from the RFID reader; and transmitting a reply to a received signal from the RFID reader using power stored from the previously received RF signals, independent of an internal power source.

14. The method of claim 13, further comprising:

demodulating at least a portion of the received RF signals to baseband frequency signals; and selecting one of the plurality of antennas to wirelessly transmit at least a portion of the received RF signals based at least in part on the baseband frequency signals.

* * * * *

UNITED STATES PATENT AND TRADEMARK OFFICE
CERTIFICATE OF CORRECTION

PATENT NO.      : 8,446,256 B2
APPLICATION NO. : 12/123237
DATED           : May 21, 2013
INVENTOR(S)     : Jason Pinkham It is certified that error appears in the above-identified patent and that said Letters Patent is hereby corrected as shown below:

In the Claims

Claim 12, Col. 13, Line 14, before "combined" delete "include".

Signed and Sealed this
Nineteenth Day of November, 2013

Teresa Stanek Rea
*Deputy Director of the United States Patent and Trademark Office*